(12) United States Patent
Kim et al.

(10) Patent No.: US 8,164,699 B2
(45) Date of Patent: Apr. 24, 2012

(54) DISPLAY PANEL AND METHOD THEREOF

(75) Inventors: Yoon-Jang Kim, Suwon-si (KR); Sahng-Ik Jun, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 909 days.

(21) Appl. No.: 12/199,842

(22) Filed: Aug. 28, 2008

(65) Prior Publication Data

US 2009/0109134 A1    Apr. 30, 2009

(30) Foreign Application Priority Data

Oct. 31, 2007 (KR) .......................... 10-2007-0110338

(51) Int. Cl.
*G02F 1/1333* (2006.01)
*G02F 1/1335* (2006.01)
(52) U.S. Cl. .......................................... 349/40; 349/106
(58) Field of Classification Search .................... 349/40, 349/106
See application file for complete search history.

(56) References Cited

U.S. PATENT DOCUMENTS

| 6,888,608 B2 | 5/2005 | Miyazaki et al. |
| 2006/0023135 A1* | 2/2006 | Park .............................. 349/40 |
| 2006/0170854 A1 | 8/2006 | Han et al. |

FOREIGN PATENT DOCUMENTS

| JP | 2005-070808 | 3/2005 |
| JP | 2006-048006 | 2/2006 |
| JP | 2006-215563 | 8/2006 |
| KR | 10-0227692 | 11/1999 |
| KR | 1020060043040 A | 5/2006 |
| KR | 1020060121371 A | 11/2006 |

* cited by examiner

*Primary Examiner* — Nathanael R Briggs
(74) *Attorney, Agent, or Firm* — Cantor Colburn LLP (57) ABSTRACT

A display panel includes a first substrate having a first line and a second line and a second substrate facing the first substrate. The first substrate includes an electrostatic discharger that is electrically connected to the first line to discharge a static electricity inflowing into the display panel through the first line to an exterior. Also, the second substrate includes a common electrode through which an opening is formed by removing an area of the common electrode corresponding with the electrostatic discharger. Thus, the electrostatic discharger may be prevented from being shorted with the common electrode, thereby preventing a display quality of the display panel from being deteriorated.

13 Claims, 9 Drawing Sheets

DISPLAY PANEL AND METHOD THEREOF

This application claims priority to Korean Patent Application No. 2007-110338, filed on Oct. 31, 2007, and all the benefits accruing therefrom under 35 U.S.C. §119, the contents of which in its entirety are herein incorporated by reference.

BACKGROUND OF THE INVENTION

1. Field of the Invention

The present invention relates to a display panel and a method thereof. More particularly, the present invention relates to a display panel capable of improving a display quality thereof, and a method of improving a display quality of the display panel.

2. Description of the Related Art

In general, a display panel includes a first substrate and a second substrate facing the first substrate, and each of the first and second substrates has an electrode. In case of a liquid crystal display ("LCD") panel having a liquid crystal layer between the first and second substrates, the electrodes arranged in each of the first and second substrates form an electric field between the first and second substrates to control directors of liquid crystal molecules in the liquid crystal layer.

Meanwhile, the electrodes arranged in the first and second substrates are shorted due to various reasons, for example, static electricity having a high voltage. When the electrodes of the first and second substrates are shorted, a voltage level provided to the electrodes is changed, thereby causing defects in a display of the display panel.

BRIEF SUMMARY OF THE INVENTION

The present invention provides a display panel having improved display quality. The present invention also provides a method of improving a display quality of the display panel.

In exemplary embodiments of the present invention, a display panel includes a first substrate, a second substrate facing the first substrate, a first line arranged on the first substrate, a second line arranged on the first substrate and insulated from the first line, an electrostatic discharger, and a common electrode arranged on the second substrate.

The electrostatic discharger is electrically connected to the first line to discharge static electricity inflowing through the first line to an exterior. Also, since the common electrode is provided with an opening formed therethrough by removing an area of the common electrode corresponding with the electrostatic discharger, the common electrode may be prevented from being shorted with the electrostatic discharger in an area where the common electrode faces the electrostatic discharger.

In other exemplary embodiments of the present invention, a display panel includes a first substrate on which a display area and a peripheral area are defined, a second substrate facing the first substrate, a first line arranged on the first substrate, a second line arranged on the first substrate and insulated from the first line, an electrostatic discharger arranged in the peripheral area, a common electrode arranged on the second substrate, and a spacer arranged between the first substrate and the second substrate corresponding to the peripheral area.

The spacer makes contact to the first and second substrates and uniformly maintains both cell gaps in the display area and the peripheral area, therefore preventing the common electrode from being shorted with the electrostatic discharger.

In still other exemplary embodiments of the present invention, a method of improving a display quality of a display panel, the display panel including an electrostatic discharger provided on a first substrate in a peripheral area of the display panel, includes preventing a common electrode formed on a second substrate of the display panel from shorting with the electrostatic discharger by providing a distance between the common electrode and the electrostatic discharger where high voltage flowing through an electrostatic diode of the electrostatic discharger does not cause the common electrode to short with the electrostatic discharger.

Providing the distance between the common electrode and the electrostatic discharger may include providing an opening in the common electrode, the opening overlapping with the electrostatic diode, or may include providing a spacer between the electrostatic discharger and the common electrode, the spacer contacting the first and second substrates.

According to the above, the electrostatic diode may be prevented from being shorted with the common electrode due to the static electricity having the high voltage flowing through the electrostatic diode. Therefore, a display quality of the display panel may be prevented from being deteriorated by the common voltage applied from the common electrode to the electrostatic diode.

BRIEF DESCRIPTION OF THE DRAWINGS

The above and other features and advantages of the present invention will become readily apparent by reference to the following detailed description when considered in conjunction with the accompanying drawings wherein.

DETAILED DESCRIPTION OF THE INVENTION

The invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 1:
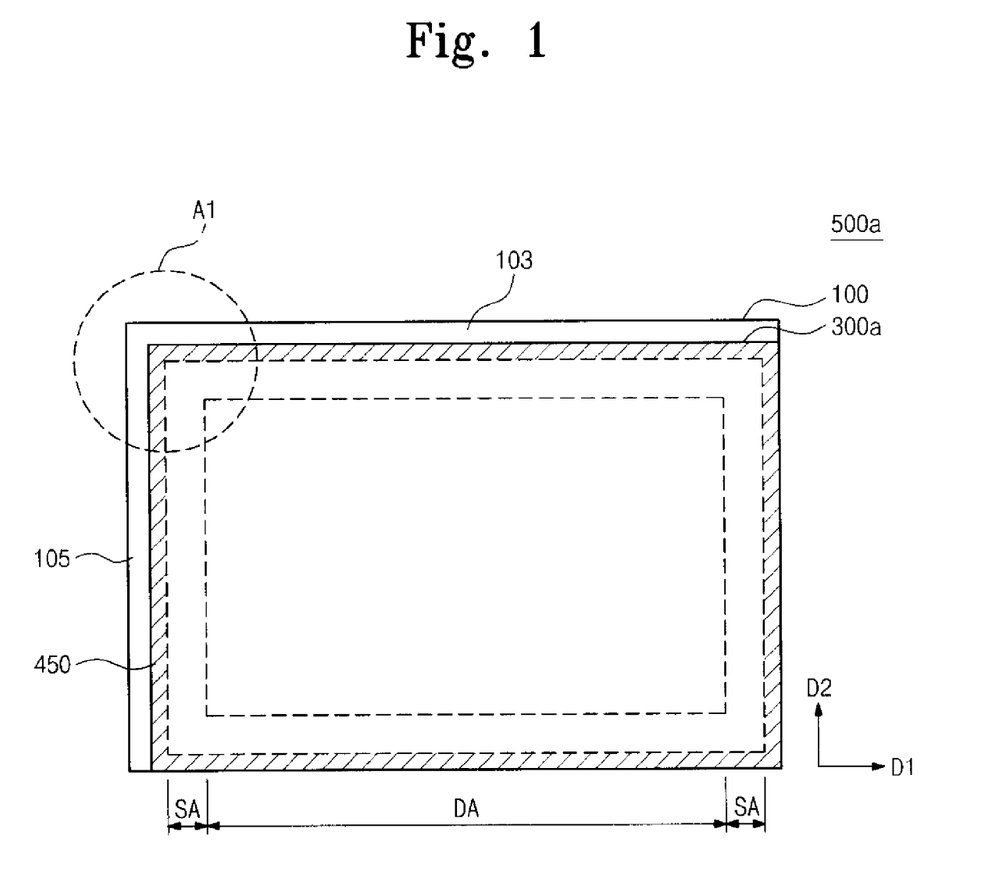
FIG. 1 is a plan view showing an exemplary embodiment of a liquid crystal display ("LCD") panel according to the present invention.

FIG. 1 is a plan view showing an exemplary embodiment of a liquid crystal display ("LCD") panel according to the present invention.

Referring to FIG. 1, an LCD panel 500a includes an array substrate 100, a color filter substrate 300a facing the array substrate 100, a liquid crystal layer 400 (shown in FIG. 4) interposed between the array substrate 100 and the color filter substrate 300a, and a sealant 450.

The LCD panel 500a may have a substantially rectangular shape. A longer side of the LCD panel 500a is arranged substantially parallel with a first direction D1, and a shorter side of the LCD panel 500a is arranged substantially parallel with a second direction D2 that is substantially perpendicular to the first direction D1. Also, a display area DA in which an image is displayed and a peripheral area SA in which an image is not displayed are defined in the LCD panel 500a. More particularly, the peripheral area SA is arranged between the display area DA and an area in which the sealant 450 is formed.

That is, the display area DA and the peripheral area SA are defined in both the array substrate 100 and the color filter substrate 300a, and thus, the display area DA and the peripheral area SA of the array substrate 100 are overlapped with the display area DA and the peripheral area SA of the color filter substrate 300a, respectively, when viewed in a plan view.

As will be further described below with respect to FIGS. 3 and 4, the array substrate 100 includes gate lines and data lines, and thin film transistors ("TFTs") and pixel electrodes are arranged in the display area DA. When the TFTs receive gate signals through the gate lines and are turned on, data signals provided through the data lines are output to the pixel electrodes.

Also, a gate pad part 105 is arranged in one end of the array substrate 100, and a data pad part 103 is arranged in another end that is adjacent to the gate pad part 105 of the array substrate 100. The gate pad part 105 is electrically connected to a gate driver (not shown) to provide the gate signals to the array substrate 100. The data pad part 103 is electrically connected to a data driver (not shown) to provide the data signals to the array substrate 100.

In the illustrated exemplary embodiment, one gate pad part 105 is arranged in one end of the array substrate 100, however, in an alternative exemplary embodiment, two gate pad parts may be arranged in two ends that are opposite to each other in the array substrate 100.

The color filter substrate 300a and the array substrate 100 are coupled to each other by the sealant 450 interposed therebetween. Also, the color filter substrate 300a includes a common electrode 330 (shown in FIGS. 3 and 4) that is formed thereon. The common electrode 330 forms an electric field with the pixel electrodes 150 (shown in FIG. 4) of the array substrate 100 to control directors of liquid crystal molecules in the liquid crystal layer 400 (shown in FIG. 4). The color filter substrate 300a includes a color filter 355 (shown in FIG. 2) in order to allow a white light that transmits the color filter 355 to have a predetermined color.

Figure 2:
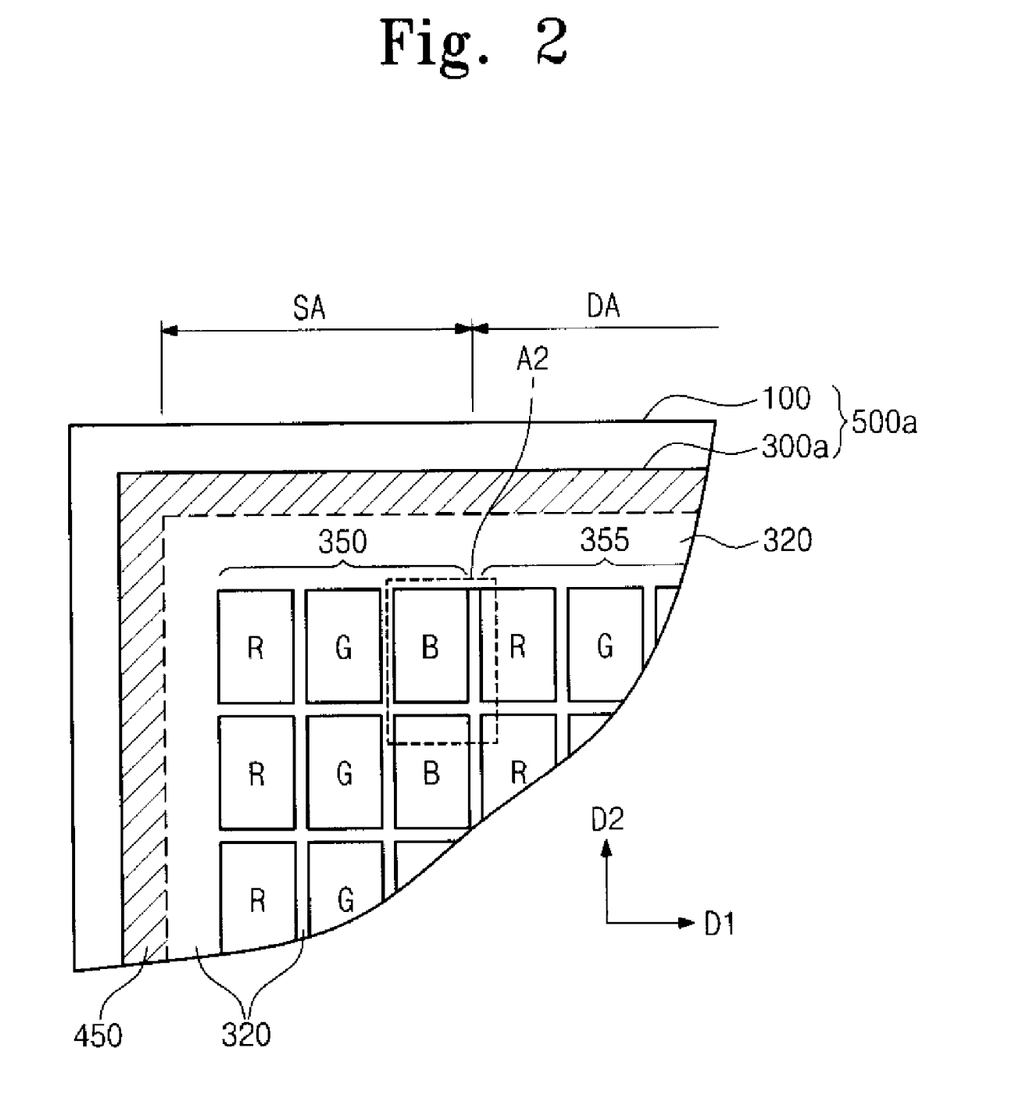
FIG. 2 is a partially enlarged view showing portion A1 of FIG. 1.

FIG. 2 is a partially enlarged view showing portion A1 of FIG. 1.

Referring to FIG. 2, the color filter substrate 300a includes a dummy color filter 350 formed in the peripheral area SA of the color filter substrate 300a and a color filter 355 formed in the display area DA of the color filter substrate 300a. Each of the dummy color filter 350 and the color filter 355 includes a red color filter R, a green color filter G, and a blue color filter B that are arranged in the first direction D1 and the second direction D2 in a matrix configuration.

In the present exemplary embodiment, the dummy color filter 350 is arranged in three rows, however, the dummy color filter may alternatively be arranged in a number of rows that is smaller or greater than three rows.

The color filter 355 is formed in the display area DA of the color filter substrate 300a to allow the white light that transmits the color filter 355 to have the predetermined color.

Also, the color filter substrate 300a includes a black matrix 320. The black matrix 320 is arranged between the color filters 355 adjacent to each other corresponding to the display area DA in the color filter substrate 300a and arranged corresponding to the peripheral area SA in the color filter substrate 300a. The black matrix 320 blocks lights to prevent the lights that are filtered to different colors from being mixed with each other and prevents a light leakage in the peripheral area SA. The color filter 355 and dummy color filter 350 may partially overlap the black matrix 320.

The color filter 355 and the dummy color filter 350 include a same material and are formed on the color filter substrate 300a through a same process. However, the color filter 355 filters the light to have the predetermined color, and the dummy color filter 350 is used to allow the other layers to be easily formed on the color filter substrate 300a.

For instance, when an alignment film is printed on the color filter 355, the dummy color filter 350 serves as a buffer to uniformly form the alignment film formed in an outermost portion of the display area DA. If the dummy color filter 350 is not arranged in the peripheral area SA, then the alignment film formed on the color filter 350 in the outermost portion of the display area DA may be uneven. This is because a height of the alignment film formed would be drastically lowered in a border area between the peripheral area SA and the display area DA due to a height of the color filter 350.

However, when the dummy color filter 350 is formed in the peripheral area SA, the dummy color filter 350 may prevent the height of the alignment film formed in the border area between the peripheral area SA and the display area DA from being lowered, thereby forming the alignment film on the color filter 355 in substantially uniform thickness.

Figure 3:
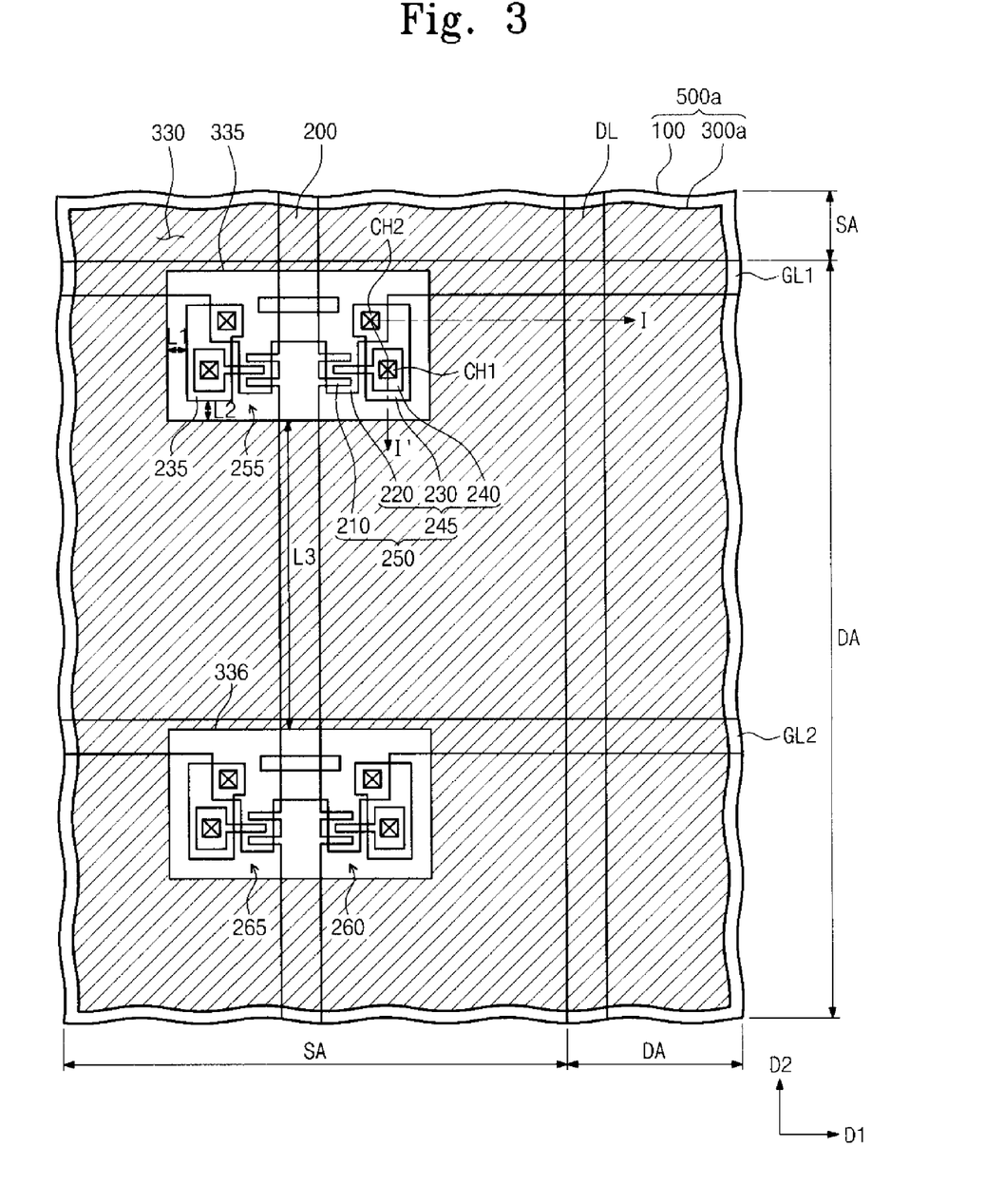
FIG. 3 is a partially enlarged view showing portion A2 of FIG. 2.

FIG. 3 is a partially enlarged view showing portion A2 of FIG. 2.

Referring to FIG. 3, the array substrate 100 includes a first gate line GL1, a second gate line GL2, a data line DL, and an electrostatic discharge line 200. The first and second gate lines GL1 and GL2 are elongated in the first direction D1, and the data line DL and the electrostatic discharge line 200 are elongated in the second direction D2. Thus, the data line DL and the electrostatic discharge line 200 may extend substantially perpendicular to the first and second gate lines GL1 and GL2.

The electrostatic discharge line 200 is arranged in the peripheral area SA and formed together with the data line DL through a same process. That is, the electrostatic discharge line 200 is formed within the array substrate 100 at substantially the same time and within the same layer as the data line DL is formed within the array substrate 100. The data line DL is elongated to the data pad part 103 to provide the data signal to the LCD panel 500a, however, since the electrostatic discharge line 200 is not elongated to the data pad part 103, the electrostatic discharge line 200 does not provide the data signal to the LCD panel 500a.

The array substrate 100 includes a plurality of electrostatic diodes arranged adjacent to an area where the electrostatic discharge line 200 is intersected with the first and second gate lines GL1 and GL2. More particularly, a first electrostatic diode 250 and a second electrostatic diode 255 are arranged adjacent to an area where the first gate line GL1 is intersected with the electrostatic discharge line 200, and a third electrostatic diode 260 and a fourth electrostatic diode 265 are arranged adjacent to an area where the second gate line GL2 is intersected with the electrostatic discharge line 200. The first and second electrostatic diodes 250 and 255 face each other interposing the electrostatic discharge line 200 therebetween, and the third and fourth electrostatic diodes 260 and 265 face each other interposing the electrostatic discharge line 200 therebetween.

The first electrostatic diode 250 includes a first electrode 245 and a second electrode 210. The first electrode 245 includes a first sub electrode 220, a second sub electrode 240, and a first bridge electrode 230 that is electrically connected to the first and second sub electrodes 220 and 240 through a first contact hole CH1 and a second contact hole CH2, respectively.

The first sub electrode 220 is branched from the first gate line GL1, and the second sub electrode 240 is formed together with the electrostatic discharge line 200 through a same process, although spaced from the electrostatic discharge line 200, and the second electrode 210 is branched from the electrostatic discharge line 200.

Although not shown in FIGS. 1 to 3, an active pattern that is overlapped with the first electrode 245 and the second electrode 210 is formed under the first electrode 245 and the second electrode 210. Thus, when a static electricity having a voltage level higher than a threshold voltage of the active pattern is applied to the active pattern from the first electrode 245, the static electricity is discharged to the electrostatic discharge line 200 through the active pattern and the second electrode 210.

In the present exemplary embodiment, two electrostatic diodes are arranged to face each other while interposing one gate line therebetween, however, in order to improve an electrostatic discharge effect, more than two electrostatic diodes may be arranged corresponding to one gate line.

Also, in the present exemplary embodiment, one electrostatic discharge line is arranged adjacent to the gate pad part 105 (shown in FIG. 1) of the peripheral area SA, however, if the LCD panel 500a includes two gate pad parts arranged at opposite ends of the LCD panel 500a, then two electrostatic discharge lines may be arranged adjacent to the two gate pad parts, respectively. Also, if the LCD panel 500a includes two electrostatic discharge lines, then the electrostatic diodes may be arranged corresponding to each electrostatic discharge line. Also, in an alternative arrangement, the electrostatic discharger which includes an electrostatic diode and an electrostatic discharge line may be connected to a data line.

The color filter substrate 300a includes the common electrode 330 through which openings are formed by removing areas overlapped with the electrostatic diodes. More particularly, a first opening 335 is formed through the common electrode 330 by removing an area overlapped with the first and second electrostatic diodes 250 and 255, and a second opening 336 is formed through the common electrode 330 by removing an area overlapped with the third and fourth electrostatic diodes 260 and 265.

The first and second electrostatic diodes 250 and 255 serve as a path through which a static electricity having a high voltage flows, and the common electrode 330 formed on the color filter substrate 300a corresponding to the peripheral area SA is formed on the black matrix 320 (shown in FIG. 2) and the dummy color filter 350 (shown in FIG. 2). As a result, since the LCD panel 500a has a smaller cell gap in the peripheral area SA than that of the display area DA, the common electrode 330 may be easily shorted with the first and second electrostatic diodes 250 and 255 in an area where the common electrode 330 faces the first and second electrostatic diodes 250 and 255. However, the first opening 335 is formed through the common electrode 330, so that the first and second electrostatic diodes 250 and 255 may be prevented from being shorted with the common electrode 330.

Meanwhile, when viewed in a plan view, a bridge electrode of a first electrode of an electrostatic diode overlapped with one of the openings in the common electrode 330 is required to be spaced apart from a face of the common electrode 330 that defines the opening by a distance of at least equal to or more than 20 μm. For instance, each of a first distance L1 and a second distance L2 between the first opening 335 and the second bridge electrode 235 is at least equal to or more than 20 μm. The distances between the first opening 335 and the second bridge electrode 235 are calculated considering a process margin when assembling the array substrate 100 and the color filter substrate 300a.

The first opening 335 and the second opening 336 are spaced apart from each other by a third distance L3. Although not shown in FIG. 3, a structure where only one opening is formed through the common electrode 330 corresponding to entire gate lines may be applied to the color filter substrate 300a, however, this is not proper since a resistance of the common electrode 330 increases due to the opening.

Figure 4:
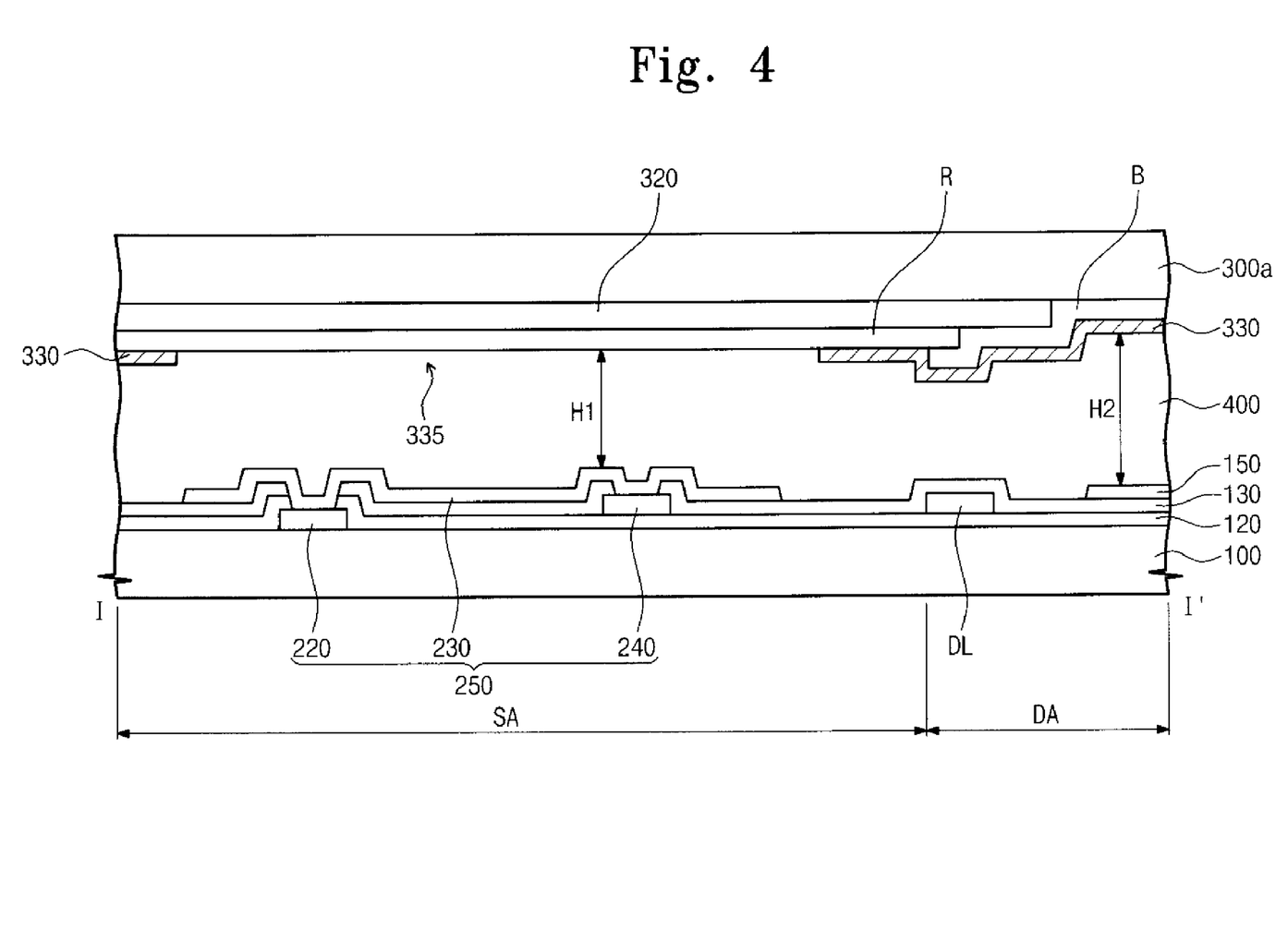
FIG. 4 is a cross-sectional view taken along line I-I' of FIG. 3.

FIG. 4 is a cross-sectional view taken along line I-I' of FIG. 3.

Referring to FIG. 4, the color filter substrate 300a includes the black matrix 320 formed in the peripheral area SA. A blue color filter B is arranged on both the black matrix 320 and the color filter substrate 300a, and a red color filter R is arranged on the black matrix 320, which is adjacent to the blue color filter B. The blue color filter B may partially overlap the black matrix 320 and the red color filter R. Also, the color filter substrate 300a is provided with the common electrode 330 through which the opening 335 is formed by removing the area overlapped with the first electrostatic diode 250.

The first electrostatic diode 250 is arranged on the array substrate 100 to face the first opening 335, and a pixel electrode 150 is arranged in the display area DA. The first sub electrode 220 is insulated from surrounding portions thereof by a gate insulating layer 120, and the second sub electrode 240 and the data line DL are also insulated from the surrounding portions thereof by an inter-insulating layer 130.

Since the black matrix 320 is entirely formed over the peripheral area SA, a first cell gap H1 in the peripheral area SA is smaller than a second cell gap H2 in the display area DA. Also, a spacer (not shown in FIG. 4) is arranged between the color filter substrate 300a and the array substrate 100 in the display area DA, and the first cell gap H1 becomes smaller than the second cell gap H2.

If the first opening 355 is not formed through the common electrode 330, then the first electrostatic diode 250 that is formed in the peripheral area SA and to which the static electricity having the high voltage flows may be easily shorted with the common electrode 330. However, according to the present exemplary embodiment, since the first opening 335 is formed through the common electrode 330, the first bridge electrode 230 of the first electrostatic diode 250 may be prevented from being shorted with the common electrode 330. As a result, even if the first electrostatic diode 250 is shorted with the common electrode 330, an abnormal current may be prevented from being applied to the first gate line GL1 from the common electrode 330 through the first electrostatic diode 250, therefore preventing change of direction of the director in the liquid crystal layer 400 due to the abnormal current.

Figure 5:
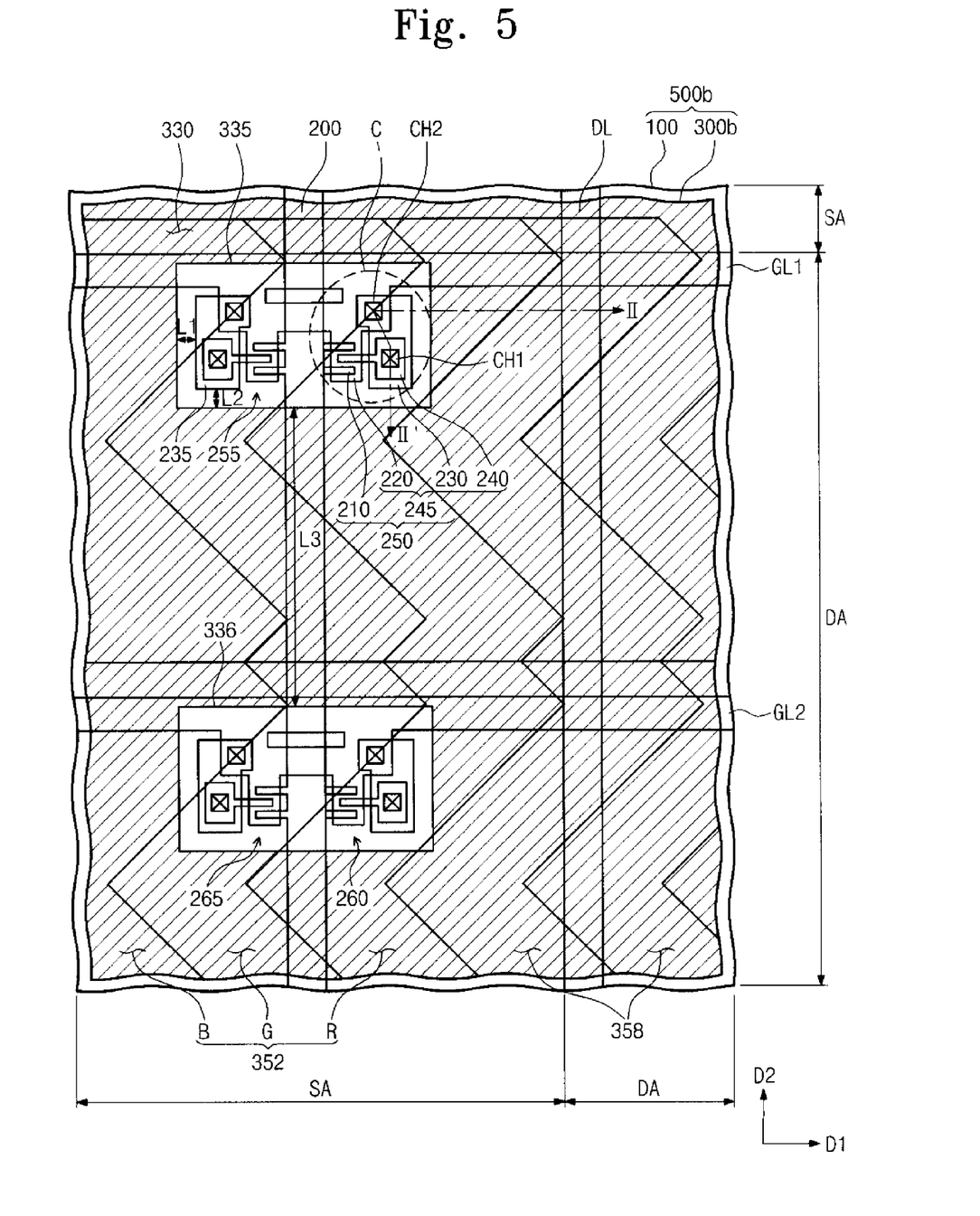
FIG. 5 is a plan view showing another exemplary embodiment of an LCD panel according to the present invention.

FIG. 5 is a plan view showing another exemplary embodiment of an LCD panel according to the present invention. In FIG. 5, the same reference numerals denote the same elements or substantially same elements in FIG. 3, and thus the detailed descriptions of the same elements will be omitted.

Referring to FIG. 5, LCD panel 500b includes a color filter substrate 300b including a dummy color filter 352 formed in a peripheral area SA and a color filter 358 formed in a display area DA. Each of the dummy color filter 352 and the color filter 358 is formed in a Z-like or zigzag shape.

The dummy color filter 352 includes a red color filter R, a green color filter G, and a blue color filter B. In the present exemplary embodiment, the dummy color filter 352 is formed in an order of the blue color filter B, the green color filter G, and the red color filter R. Thus, different color filters are partially overlapped with each other in a border area between adjacent dummy color filters 352, and therefore, a cell gap of the LCD panel 500b in the area where the different color filters are overlapped with each other becomes smaller than a cell gap in an area where the different color filters are not overlapped with each other.

For instance, a cell gap H3 (shown in FIG. 6) in an overlapped area C where the red color filter R and the green color filter G are overlapped with each other is smaller than that in a surrounding area of the overlapped area C. Also, the overlapped area C faces the first electrostatic diode 250 arranged on the array substrate 100.

If the opening 335 is not formed through the common electrode 330, then the first electrostatic diode 250 may be shorted with the common electrode 330 when the static electricity having the high voltage flows through the first electrostatic diode 250. However, according to the present exemplary embodiment, since the opening 355 is formed through the common electrode 330 with which the first electrostatic diode 250 is overlapped, the first electrostatic diode 250 may be prevented from being shorted with the common electrode 330 even though the cell gap in the overlapped area C is smaller than the cell gap in the surrounding area. That is, the opening 355 overlaps the first electrostatic diode 250 to prevent the bridge electrode 230 of the array substrate 100 and the common electrode 330 on the color filter substrate 300b from being too close.

Figure 6:
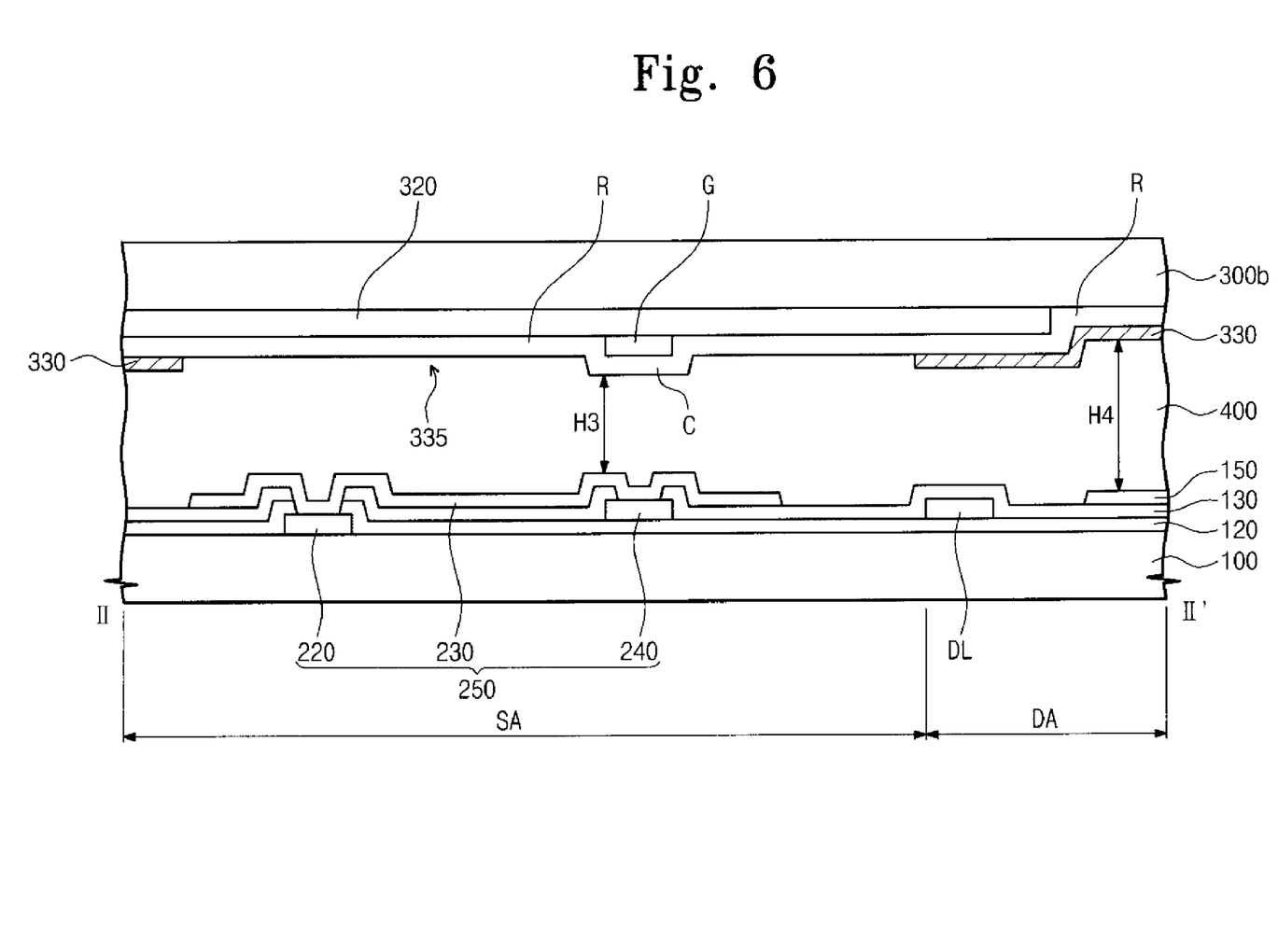
FIG. 6 is a cross-sectional view taken along line II-II' of FIG. 5.

FIG. 6 is a cross-sectional view taken along line II-II' of FIG. 5.

Referring to FIG. 6, the red color filter R and the green color filter G are sequentially formed on the color filter substrate 300b, and the red color filter R and the green color filter G are overlapped in the overlapped area C. The green color filter G may be formed on the color filter substrate 300b prior to the red color filter R. Accordingly, a third cell gap H3 between the red color filter R and the bridge electrode 230 in the overlapped area C is smaller than a fourth cell gap H4 between the common electrode 330 and the pixel electrode 150 in the display area DA. However, since the common electrode 330 is not formed in the overlapped area C, the common electrode 330 may not be shorted with the first electrostatic diode 250.

Figure 7:
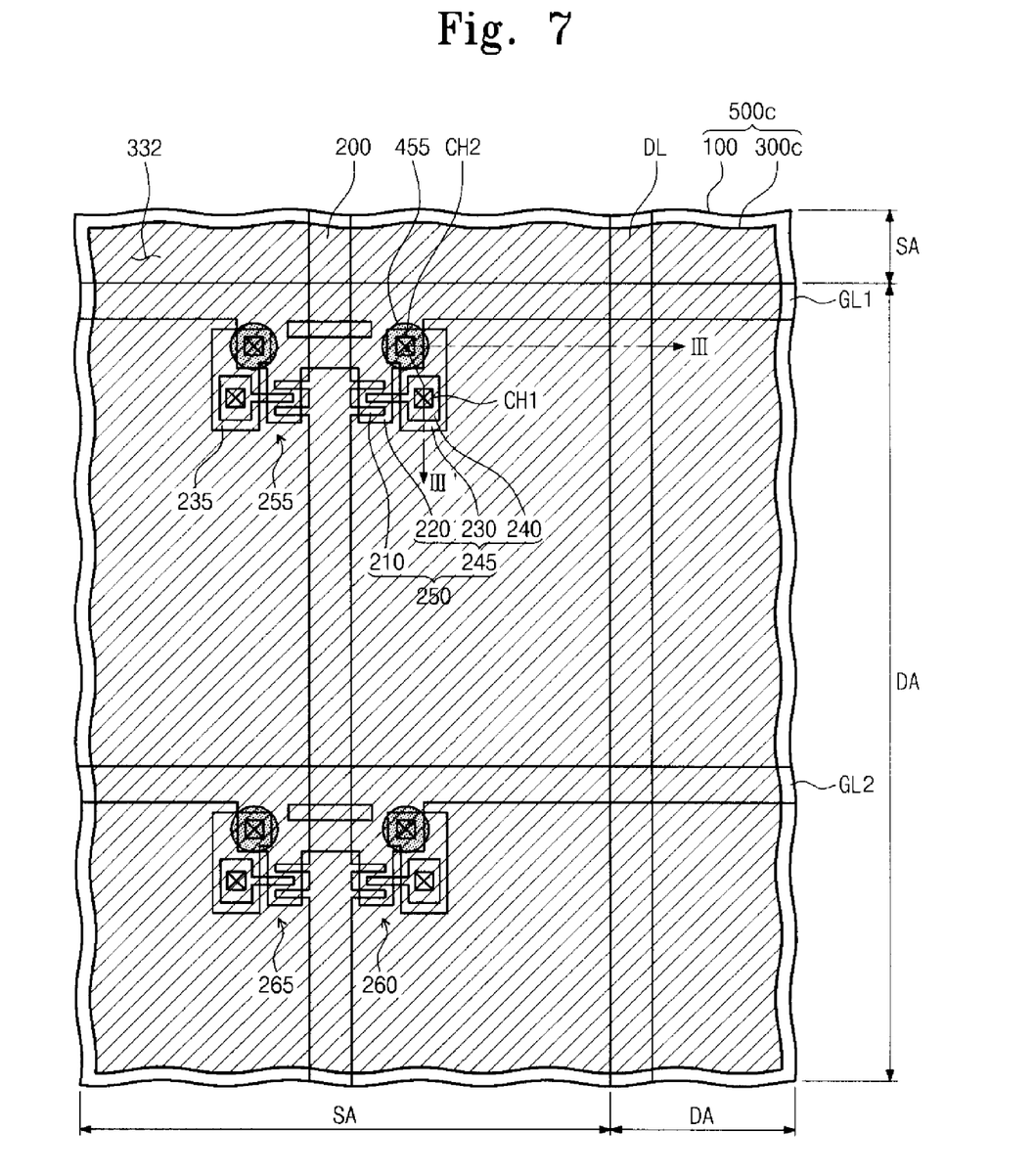
FIG. 7 is a plan view showing another exemplary embodiment of an LCD panel according to the present invention.
Figure 8:
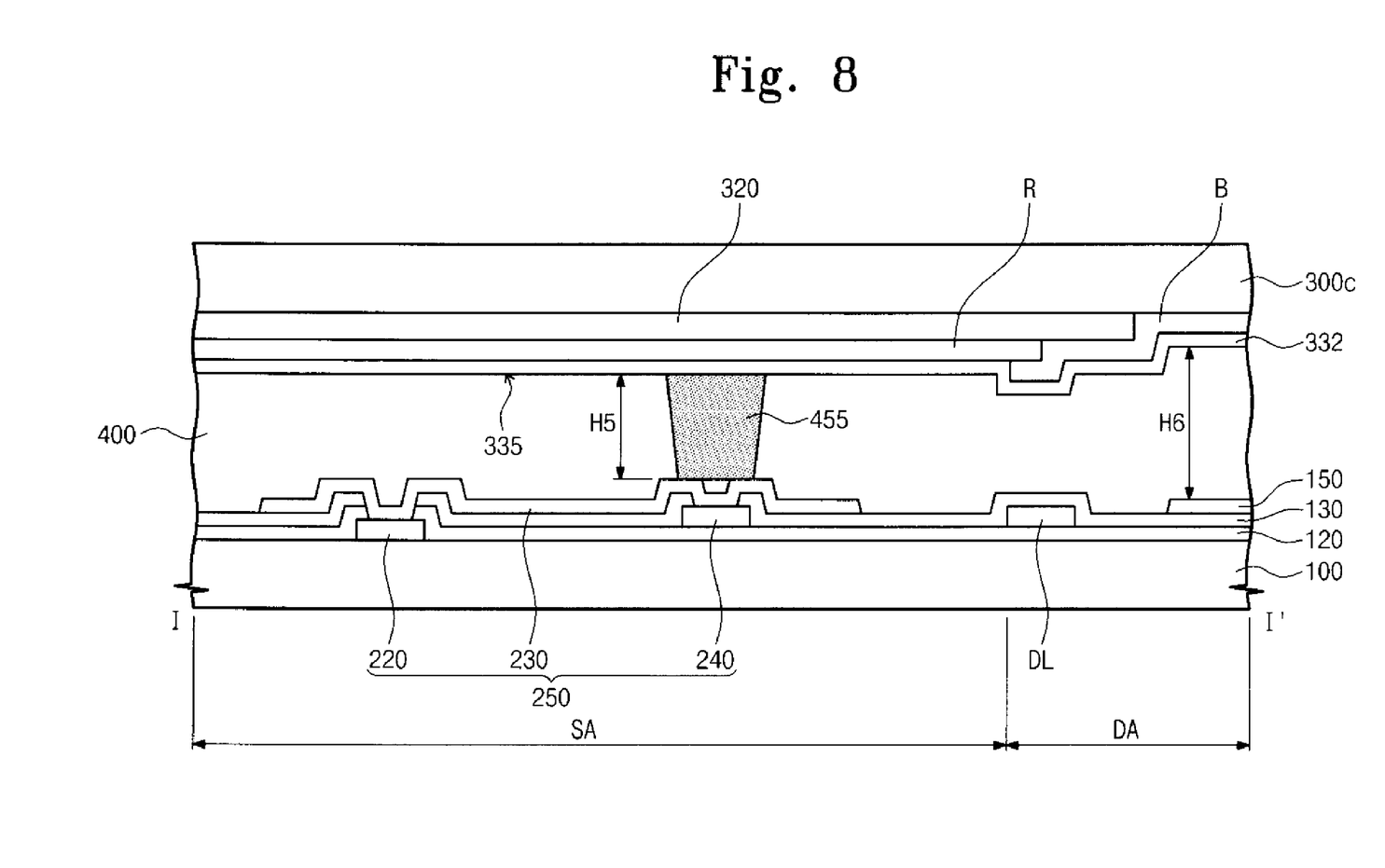
FIG. 8 is a cross-sectional view taken along line III-III' of FIG. 7.

FIG. 7 is a plan view showing another exemplary embodiment of an LCD panel according to the present invention, and FIG. 8 is a cross-sectional view taken along line III-III' of FIG. 7. In FIGS. 7 and 8, the same reference numerals denote the same elements in FIGS. 5 and 6, and thus the detailed descriptions of the same elements or substantially the same elements will be omitted.

Referring to FIGS. 7 and 8, an LCD panel 500c includes an array substrate 100 including electrostatic diodes 250, 255, 260, 265, and a color filter substrate 300c including a common electrode 332, a plurality of color filters arranged in a display area DA, and a dummy color filter arranged in a peripheral area SA. Also, a spacer 455 is arranged corresponding to the peripheral area SA between the array substrate 100 and the color filter substrate 300c.

The spacer 455 makes contact with each of the array substrate 100 and the color filter substrate 300c to maintain a distance between the array substrate 100 and the color filter substrate 300c. The spacer 455 is arranged in the peripheral area SA to decrease a height difference between a fifth cell gap H5 in the peripheral area SA and a sixth cell gap H6 in the display area DA of the LCD panel 500c. Accordingly, even though a portion of the common electrode 332, which is overlapped with the electrostatic diodes 250, 255, 260, 265, is not removed, the cell gaps in the LCD panel 500c are uniformly maintained or at least substantially uniformly maintained in the peripheral area SA and the display area DA, thereby preventing the electrostatic diodes 250, 255, 260, 265 from being shorted with the common electrode 332.

In the present exemplary embodiment, a structure where one spacer is arranged corresponding to each electrostatic diode has been shown, however, two or more spacers may be arranged corresponding to each electrostatic diode.

Figure 9:
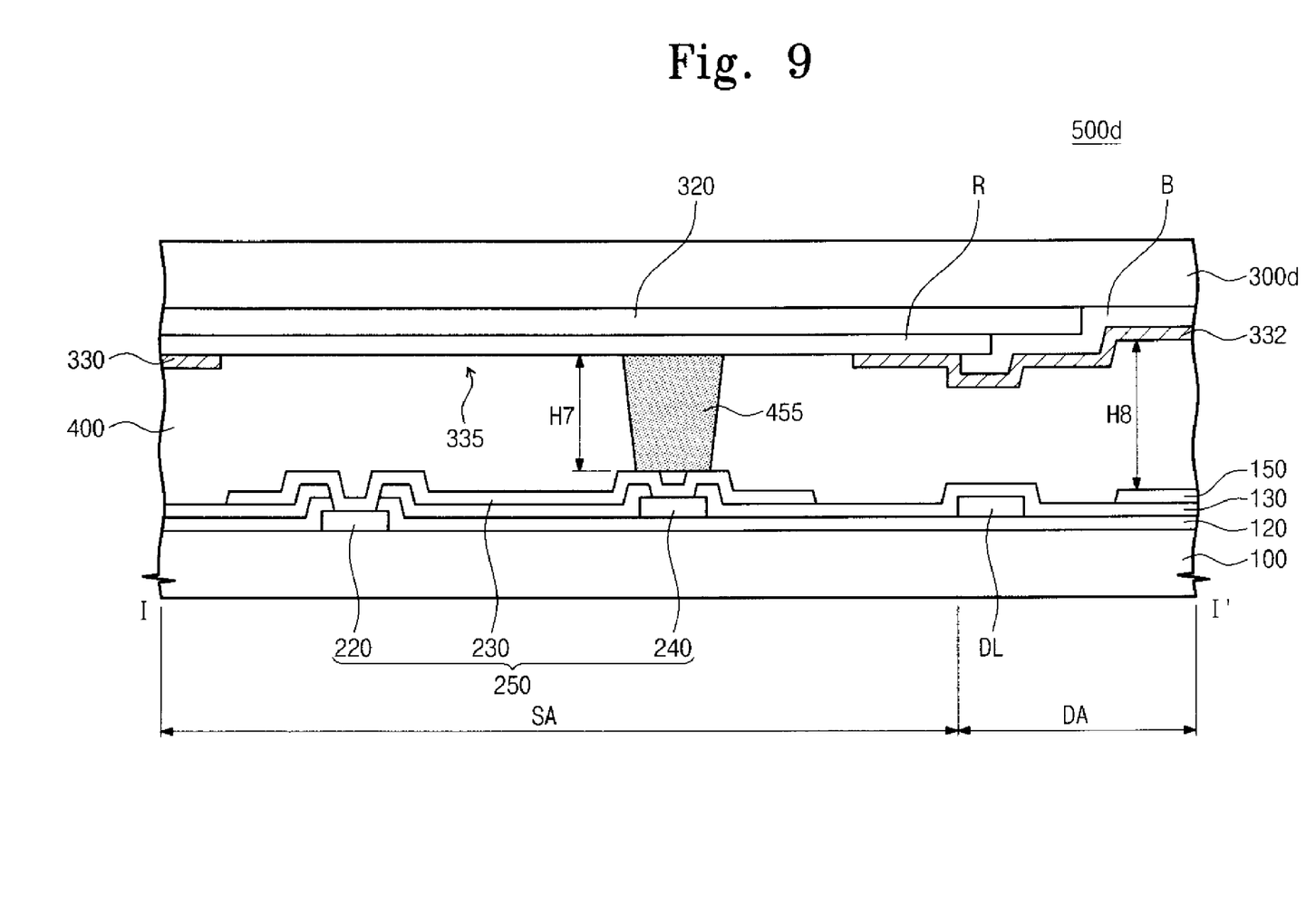
FIG. 9 is a cross-sectional view showing another exemplary embodiment of an LCD panel according to the present invention.

FIG. 9 is a cross-sectional view showing another exemplary embodiment of an LCD panel according to the present invention. In FIG. 9, the same reference numerals denote the same elements in FIG. 8, and thus the detailed descriptions of the same elements or substantially same elements will be omitted.

Referring to FIG. 9, an LCD panel 500d includes an array substrate 100 including a first electrostatic diode 250 arranged in a peripheral area SA thereof, and a color filter substrate 300d including a common electrode 330 through which an opening 335 is formed by removing an area of the common electrode 330, which is overlapped with the first electrostatic diode 250.

Also, a spacer 455 is arranged between the array substrate 100 and the color filter substrate 300d corresponding to the peripheral area SA. The spacer 455 may uniformly maintain a seventh cell gap H7 in the peripheral area SA and an eighth cell gap H8 in a display area DA.

Thus, the cell gaps are uniformly maintained in the peripheral area SA and the display area DA of the LCD panel 500d. Further, the opening 335 is formed through the common electrode 330 corresponding to the first electrostatic diode 250, thereby preventing the first electrostatic diode 250 from being shorted with the common electrode 330.

According to the above, the display panel includes the substrate having the electrostatic diode and the substrate having the common electrode, and in an exemplary embodiment the common electrode is provided with an opening formed by removing an area of the common electrode overlapped with the electrostatic diode. Thus, the electrostatic diode may be prevented from being shorted with the common electrode due to the static electricity having the high voltage flowing through the electrostatic diode. Therefore, a display quality of the display panel may be prevented from being deteriorated by the common voltage applied from the common electrode to the electrostatic diode.

Although exemplary embodiments of the present invention have been described, it is understood that the present invention should not be limited to these exemplary embodiments but various changes and modifications can be made by one of ordinary skill in the art within the spirit and scope of the present invention as hereinafter claimed.

What is claimed is:

1. A display panel comprising:
   a first substrate;
   a second substrate facing the first substrate;
   a first line arranged on the first substrate;
   a second line arranged on the first substrate and insulated from the first line;
   an electrostatic discharger arranged on the first substrate and electrically connected to the first line to discharge a static electricity inflowing through the first line; and
   a common electrode arranged on the second substrate, the common electrode provided with an opening that is formed therethrough by removing an area of the common electrode, and the opening is overlapped with the electrostatic discharger.

2. The display panel of claim 1, wherein the electrostatic discharger comprises:
   an electrostatic discharge line intersecting with the first line; and
   an electrostatic diode electrically connected to the electrostatic discharge line to provide the static electricity inflowing through the first line to the electrostatic discharge line.

3. The display panel of claim 2, wherein the first substrate comprises a display area and a peripheral area, and the electrostatic discharger is arranged in the peripheral area.

4. The display panel of claim 3, further comprising:
   a color filter arranged on the second substrate corresponding to the display area; and
   a dummy color filter arranged on the second substrate corresponding to the peripheral area.

5. The display panel of claim 4, wherein the opening is formed by removing a portion of the common electrode arranged between the dummy color filter and the electrostatic diode.

6. The display panel of claim 3, wherein the first line is extended in a first direction, and the second line is extended in a second direction that is substantially perpendicular to the first direction.

7. The display panel of claim 6, wherein the electrostatic diode is arranged corresponding to the first line in one-to-one fashion and arranged in the second direction.

8. The display panel of claim 7, wherein the display area has a rectangular shape of which a short side is substantially parallel with the second direction, and the electrostatic diode is arranged in the peripheral area adjacent to at least one short side of the display area.

9. The display panel of claim 8, wherein the opening corresponding to the electrostatic diode is spaced apart from an opening corresponding to an adjacent electrostatic diode by a predetermined distance.

10. The display panel of claim 3, further comprising a spacer arranged between the electrostatic discharger and the common electrode corresponding to the peripheral area.

11. The display panel of claim 2, wherein the electrostatic diode comprises:
    a first electrode electrically connected to the first line through a conductive layer; and
    a second electrode receiving the static electricity from the first electrode in order to discharge the static electricity to the electrostatic discharge line.

12. The display panel of claim 11, wherein a distance between the opening and the conductive layer is equal to or more than about 20 μm in a plan view.

13. The display panel of claim 1, wherein the first line is a data line or a gate line.

* * * * *